United States Patent
Toyoshima

[15] 3,650,003
[45] Mar. 21, 1972

[54] METHOD OF MANUFACTURING AN ENERGY TRAPPED TYPE CERAMIC FILTER

[72] Inventor: Isao Toyoshima, Kyoto-fu, Japan
[73] Assignee: Murata Manufacturing Co., Ltd., Kyoto-fu, Japan

[22] Filed: Mar. 19, 1969
[21] Appl. No.: 808,494

[30] Foreign Application Priority Data

Mar. 21, 1968 Japan....................................43/18383

[52] U.S. Cl.....................................29/25.35, 29/423, 29/424, 29/588
[51] Int. Cl.........................................B01j 17/00, H04r 17/00
[58] Field of Search..........................29/25.35, 588, 423, 424; 261/272, 313, 317;310/9.1

[56] References Cited

UNITED STATES PATENTS

| | | | |
|---|---|---|---|
| 3,453,458 | 7/1969 | Curran et al. | 310/9.1 |
| 3,006,711 | 10/1961 | Silver | 310/9.1 |
| 2,548,353 | 4/1951 | Cunningham | 264/317 |

*Primary Examiner*—John F. Campbell
*Assistant Examiner*—Richard Bernard Lazarus
*Attorney*—Wenderoth, Lind & Ponack

[57] ABSTRACT

Method of manufacturing an energy trapped type ceramic filter. The method comprises forming a thin layer of thermofusing material on and about the resonator electrode portions. Thereafter an insulative resinous outer layer is placed on the thermofusing material to cover all the portions. A gap or gaps between said resonator electrode and said outer layer is formed by heating the assembly for causing the thin layer to be fused and to be absorbed into said outer layer.

7 Claims, 7 Drawing Figures

PATENTED MAR 21 1972

3,650,003

INVENTOR
ISAO TOYOSHIMA

BY Wenderoth, Lind & Ponack
ATTORNEYS

METHOD OF MANUFACTURING AN ENERGY TRAPPED TYPE CERAMIC FILTER

This invention relates generally to a method for manufacturing a piezoelectric ceramic resonator, and more particularly to a method for manufacturing an energy trapped type piezoelectric ceramic resonator which is used as an electric wave filter or an impedance transformer, and also to a manufacturing method suitable for mass production which enables very efficient and economic manufacture of a ceramic filter which is small in size and with stable characteristics.

The term "piezoelectric ceramic" used frequently herein designates ceramics which are made of fired polycrystalline ceramic materials, and which are capable of providing, by operation of electrical polarization, piezoelectric characteristics generally similar to those possessed inherently by certain natural dielectrics i.e., quartz crystal or Rochelle salt or the like. Among well-known piezoelectric ceramics are barium titanate and lead titanate-zirconate ceramics.

There has conventionally been used as an electric wave filter a ceramic resonator composed of such piezoelectric ceramics. However, it is difficult to provide a casing for such conventional ceramic resonators which is practical because of the vibration of the piezoelectric ceramic plate in the radial mode. That is, it is necessary for the casing for a ceramic resonator to provide an electrically secure connection as well as to avoid damping the mechanical vibration of the ceramic resonator. Among conventional methods of mechanically holding and electrically connecting the prior art ceramic resonators has been a wire-mounting method which comprises providing pin terminals on a base, supporting the ceramic resonator in air, on lead wires connected between the pin terminals and the electrodes of the ceramic resonator, and covering all the parts by an outer case. Another method comprises connecting to the electrodes of the ceramic resonator point contacts formed on flexible metal plates themselves acting as terminals, and accommodating all these parts within an outer case.

However, these prior art ceramic resonators constructed by such conventional methods have the disadvantages that the electrical characteristics of the ceramic resonators become worse when stress is put on the mechanical characteristics thereof, and the mechanical strength of the ceramic resonator becomes unstable when stress is put on the electrical characteristics. This is because these prior conventional ceramic resonators have been constituted by using both the electrical connections and mechanical features of the resonators in supporting them in the casing. Such resonators also have further disadvantages in that their size is relatively large because of difficulty in miniaturization thereof and in that their construction is not suitable for mass production.

There has recently been proposed an energy trapped type ceramic resonator which can be used as a ceramic resonator yet which does not have the above-mentioned disadvantages. An electrical filter using this resonator can be used in place of an electrical filter using a conventional ceramic resonator. The energy trapped type ceramic resonator utilizes the phenomena that vibrational energies between small electrodes provided on parts of both surfaces of the thin piezoelectric ceramic plate will be trapped only between the small electrodes and near them without expanding the electrode portions outwardly. This resonator, because it vibrates only at the electrode portions need not have means for damping vibrations of such electrode portions, and for this reason, has been manufactured in the prior art by the following steps; running external-connecting electrodes from resonator electrodes formed on a thin piezoelectric ceramic plate and connecting lead wires to said external connecting electrodes; covering the resonator electrodes with spacers made of insulative materials such as synthetic resin so as to form spaces between the resonator electrodes and the spacers; and moulding the whole ceramic assembly in a layer of insulative resin or accommodating the whole ceramic plate assembly within a casing and injecting resin into the casing to surround them. However, the piezoelectric ceramic plate and resonator electrodes formed thereon are very small in size, and it is thus very difficult and troublesome to place the spacer on the resonator electrode. Accordingly such conventional methods have been very inefficient.

It is therefore one object of the present invention to improve said conventional method for making energy trapped type ceramic resonators and to provide a method of improving the efficiency for making possible mass production at an economical cost.

It is another object of the present invention to provide a method for manufacturing a ceramic resonator which has very stable characteristics, and that is securely mechanically held such that the electrical characteristics will not be affected.

It is a further object of the present invention to provide a ceramic resonator suitable for an electrical filter which is smaller in size and simpler in construction than the prior types.

The present invention is generally characterized by the following steps: attaching, on and about the resonator electrode portions provided on a piezoelectric ceramic plate, such gap-forming materials as paraffine which is in a solid or semisolid state at a normal or room temperature but molten at a relatively low elevated temperature; thereafter forming an insulative resinous outer layer having a number of very small pores therein over the whole surface of the ceramic plate including the surface of the resonator electrode portion; applying heat thereto at or after the time of forming said insulative resinous outer layer and at the same time melting said gap-forming materials and permitting the materials to be absorbed into said insulative resinous outer layer to thereby form a gap or gaps between the resonator electrodes and the insulative resinous outer layer.

The present invention will be explained in detail hereinafter with reference to the accompanying drawings, in which.

Figure 4:
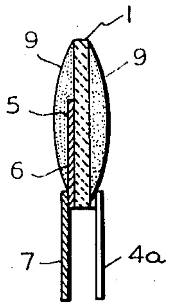
Figure 5:
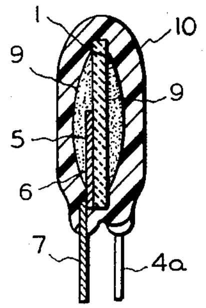
Figure 6:
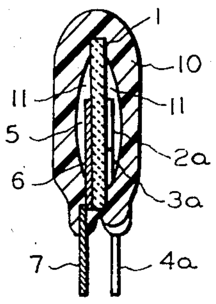
Figure 7:
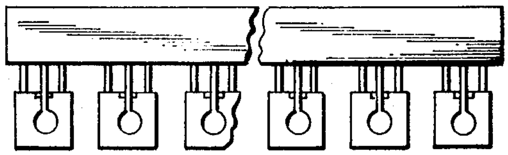

FIGS. 4 to 6 are sectional views of one embodiment of the method of the invention showing each step in the process of manufacturing the filter, FIG. 4 showing the step of placing gap-forming materials on and about resonator electrode portions of an electrical filter, FIG. 5 showing forming an insulative resinous outer layer on the gap-forming materials, and FIG. 6 showing the step of forming gaps between the resonator electrode portions and the insulative resinous layer; and FIG. 7 is a plan view showing a number of ceramic resonators for electrical filters arranged on a holder.

Figure 1:
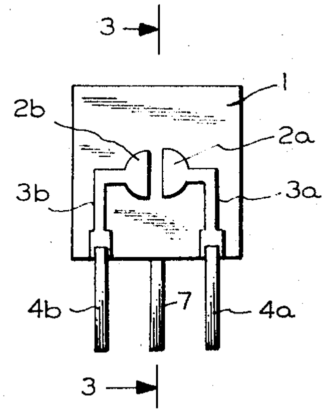
FIG. 1 is a front elevation view of a three-terminal electrode-electrical filter using an energy trapped type ceramic resonator with the insulative resinous layer removed.
Figure 2:
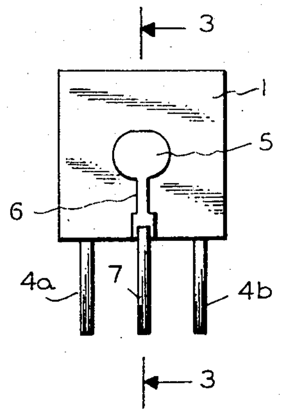
FIG. 2 is a rear elevation view of the electrical filter of FIG. 1.
Figure 3:
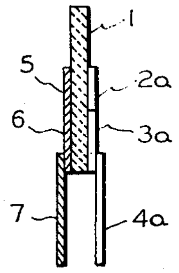
FIG. 3 is a sectional view of the electrical filter taken along the lines 3—3 of FIGS. 1 and 2.

A three-terminal type electrical filter will be described with reference to the drawings on which one example of the method of this invention is carried out. FIGS. 1 to 3 are a front view, a rear view and a sectional view of the three-terminal type electrical filter, respectively, in which reference numeral 1 denotes a piezoelectric ceramic wafer, on one surface of which are formed two split type electrodes 2*a* and 2*b*. From each of electrodes 2*a* and 2*b* are taken out outer connecting electrodes 3*a* and 3*b*, at end portions of which are connected lead wires 4*a* and 4*b*. An electrode 5 opposite to said split type electrodes 2*a* and 2*b* is provided on the rear surface of said piezoelectric ceramic plate 1, an outer connecting electrode 6 is taken out from said electrode 5, and a lead wire 7 is connected at the end portion of said outer connecting electrode 6.

The piezoelectric ceramic wafer 1 is polarized throughout, or at least between the mutually opposed electrodes, so that an energy trapped type resonator vibrating in the thickness expansion mode is established between the split electrode 2*a* and the electrode 5 and between the split electrode 2*b* and electrode 5, respectively. Further, the two energy trapped type resonators established between the split electrode 2*a* and the electrode 5 and between the split electrode 2*b* and the electrode 5 are mechanically coupled in the interior of the ceramic wafer.

The present invention is a method of forming a protective layer by covering the resonator electrode portions of such an electrical filter with an insulative resinous layer in such a way as not to affect the vibration of the resonators formed thereby. The term "electrode portions" include not only a portion situated between the split electrodes and the opposed electrode but also a portion vibrating at the periphery thereof.

FIG. 4 shows the step in the manufacturing method of the present invention in which gap-forming materials are adhered to the electrode portions of an electrical filter. Such materials can be wax, paraffin or the like which are in a solid state or semisolid state at normal or room temperature, but are easy to soften by heating, and which tend to melt away at a relatively low temperature above room temperature. The gap-forming materials are placed on the resonator electrode portions by brush coating, printing or dipping while they are molten. Immersing or dipping is more suitable for producing a thin layer on a large number of ceramic wafers all at once. The gap-forming materials are solidified in the air in a very short time.

Next, the piezoelectric ceramic wafer 1 provided with a thin layer 9 is dipped into any insulative resinous liquid comprised of a thermosetting insulative resin or resins such as those of the phenol family, the epoxy family or the like, dissolved in a solvent, and an insulative resinous outer layer 10 is produced as shown in FIG. 5. The insulative resinous outer layer 10 is solidified and simultaneously has a plurality of pores formed therein by being heated after it dries naturally. At the same time, during the heating step, the gap-forming materials such as wax, paraffin or the like forming the thin layer 9 is melted and absorbed in the insulative resinous outer layer 10, having the pores therein so that gaps 11 are formed. Vibration of the electrode portions will not be damped due to the presence of these gaps 11, so that a desirable energy trapped type filter is obtained.

The foregoing description is of the formation of the insulative resinous layer 10 by a dipping method. However, the layer 10 can be formed by molding as well as by a dipping method. In such a case the method can be carried out as follows. The piezoelectric ceramic wafer on which the coated layer 9 of the adhering gap-forming material is provided is placed in a mold. The insulative resinous layer 10 is molded around the wafer with the gap-forming material thereon by filling the mold with a thermosetting resin and heating it. This simultaneously cures the resin, forms the plurality of pores therein, and melts the gap-forming material.

Again, resins, can be used, which are not only thermosetting resins but also resins which become hard at normal temperatures. In this case, heating can be supplied after the formation of insulative resinous layer 10.

In the energy trapped type resonator, the gaps between the electrode portions and the insulative resinous layer need only be a few microns in the thickness direction of the wafer. The kinds and quantities of the gap-forming materials and the kinds of insulative resins are selected so that said gaps are easily obtained.

The method has been explained with respect to a three-terminal type electrical filter. It goes without saying that the present invention is applicable to the production of a two-terminal type electrical filter of the energy trapped type or the production of ceramic filter portions of hybrid microcircuit elements using as a substrate a piezoelectric ceramic wafer provided with energy trapped type electrical filters.

The manufacturing of a single filter has been described above. However, the present invention can also be used to manufacture a plurality of filters simultaneously by arranging a plurality of filters on a holder, e.g., as shown in FIG. 7, thereby making possible mass producing of the filters.

As is apparent from the above explanation, the present invention does not require positioning of spacers as in the prior art. It thus decreases the number of parts used in the method and the working steps as well, and the thin paraffin layer can be very easily and efficiently formed by means of a dipping step or the like. Thus mass production can be carried out more efficiently and economically than in the prior manufacturing methods.

Further, in accordance with the present invention, the ceramic resonators manufactured are very small in size relative to the prior art resonators because the gaps are formed around the resonator electrode portions without spacers.

Further, in accordance with the present invention, lead wires of the ceramic resonator can be attached to outer electrodes by solder or conductive paint and the like, and these attaching surfaces are well fixed by the insulative resinous layer. Therefore, both the electrical connection and mechanical holding are secure and firm, and thus a ceramic resonator can be obtained which is free from change in characteristics and which is durable.

I claim:

1. A method of encapsulating an energy trapped type ceramic resonator, consisting essentially of the steps of:

covering electrode portions of an energy trapped type ceramic resonator formed on a piezoelectric ceramic wafer with a thin layer of a gap-forming material which is solid or semisolid at normal temperatures and is easily melted by heating:

thereafter placing a layer of an insulative resinous material on the surface of said ceramic wafer and covering the surface of said layer of gap-forming material, said resinous material being a material which becomes porous on heating and being present in an amount sufficient to provide sufficient pores to absorb substantially all of the gap-forming material; and heating the thus covered ceramic wafer for melting away said thin layer of gap-forming material to form gaps between the resonator electrode portions and the insulative resinous layer by causing said thin layer of gap-forming material to be absorbed into the insulative resinous layer.

2. The method as claimed in claim 1, wherein said gap-forming material is wax.

3. The method as claimed in claim 1, wherein said gap-forming materials is paraffin.

4. The method as claimed in claim 1, wherein said insulative resinous layers is formed by dipping the wafer in a bath of resinuous insulative material.

5. The method as claimed in claim 1, wherein said insulative resinous layer is formed by molding insulative resinous insulative material around the wafer.

6. The method as claimed in claim 1, wherein said insulative resinous layer is of thermosetting resin and said thin layer of gap-forming material is melted by supplying heat for hardening the thermosetting resin.

7. The method as claimed in claim 1, wherein said insulative resinous layer is formed of resinous compositions which become hard at normal temperatures, said thin layers of gap-forming materials being melted by heating after the hardening of said insulative resinous layer.

* * * * *